Nov. 20, 1951  R. F. ALDERMAN  2,575,609
ARTIFICIAL FISH LURE
Filed Dec. 4, 1948
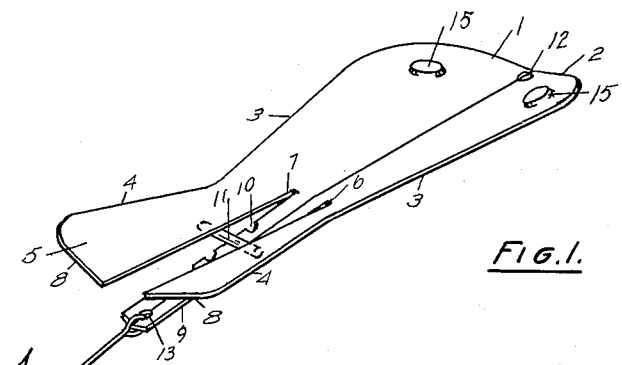
FIG.1.
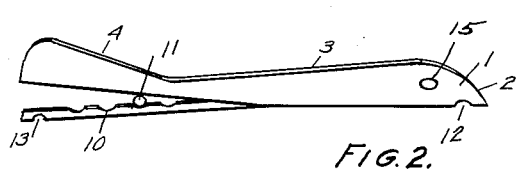
FIG.2.
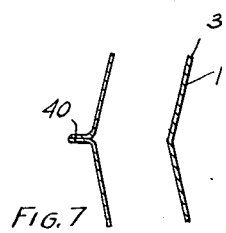
FIG.7
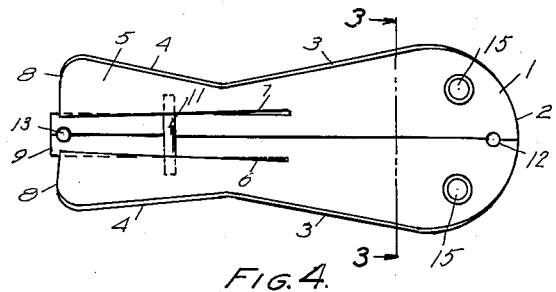
FIG.3.  FIG.4.
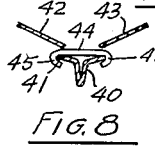
FIG.8
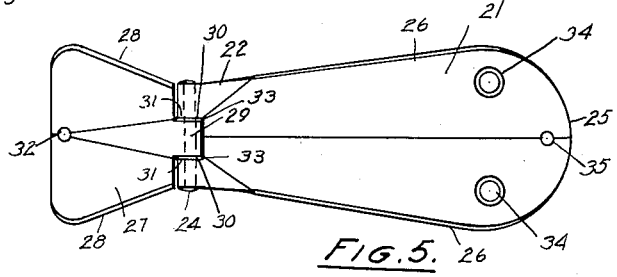
FIG.5.
FIG.6.
INVENTOR.
ROBERT F. ALDERMAN
BY
Florian H. Miller
Atty Patented Nov. 20, 1951

2,575,609

UNITED STATES PATENT OFFICE 2,575,609

ARTIFICIAL FISH LURE

Robert F. Alderman, Detroit, Mich.

Application December 4, 1948, Serial No. 63,481

5 Claims. (Cl. 43—42.22)

This invention relates generally to artificial fish lures and more particularly to adjustable, wobbling type fish lures.

All artificial fish lures, made in accordance with the teachings of the prior art and with which I am familiar, have provided no adjustable means thereon for adjusting the longitudinal angularity of the lure and thereby its action. It is particularly desirable to provide some means for adjusting the angularity of the lure to obtain variations in its action in conformance with the speed of a boat or with a particular fish desired. Furthermore, these prior lures have been very costly to manufacture and only a fisherman with considerable financial means can afford to have the different types of lure required.

It is, accordingly, an object of my invention to overcome the above and other defects in fish lures and it is more particularly an object of my invention to provide a fish lure which is simple in construction, economical in cost, economical in manufacture, and efficient in use.

Another object of my invention is to provide an angularly adjustable artificial fish lure whereby the action thereof may be varied.

Another object of my invention is to provide an artificial fish lure which may be made economically from stampings.

Other objects of my invention will become evident from the following detailed description, taken in conjunction with the accompanying drawings, in which:

Fig. 1 is a perspective view of my novel artificial fish lure;

Fig. 2 is a side elevational view of my novel fish lure;

Fig. 3 is a view taken on the line 3—3 of Fig. 4;

Fig. 4 is a top plan view of my novel fish lure;

Fig. 5 is a top plan view of a modified form of my novel fish lure;

Fig. 6 is a side elevational view of the fish lure shown in Fig. 5;

Fig. 7 is a transverse cross-sectional view of a modified form of my invention; and Fig. 8 is a transverse cross-sectional view of the tail section of a modified form of my invention.

Referring now to the drawings, I show in Figs. 1 to 4 inclusive a stamped plate member 1 of a comparatively flattened V-shaped cross-section having an enlarged, rounded nose portion 2, converging sides 3 and diverging sides 4 on the rear portion thereof forming a tail portion 5 to simulate a tail of a creature or a fish. Spaced slits 6 and 7 extending longitudinally of the member 1 and spaced centrally thereof divide the tail portion 5 of the member 1 into outer wing portions 8 and a central portion 9. The central portion 9 has transverse, longitudinally spaced, grooved portions 10 for receiving a transversely extending pin 11 which selectively seats in the grooves 10 as shown in the drawings. The pin 11 is of such width that it engages the under side of the wing portions 8 and they are forced angularly upwardly thereby as shown in the drawings. When it is desired to change the angle of the wings 8, the pin 11 is moved successively longitudinally in the grooves 10 on the center member 9. An aperture 12 is provided in the nose portion of the member 1 for connection to a line and an aperture 13 is provided on the central portion 9 of the tail 5 to secure a treble hook 14 or any other suitable hook thereto. Spaced, raised portions 15 are formed on the forward part of the body 1 to simulate the eyes of a creature such as a fish. Any suitable form of eyes such as plastic eyes may also be provided instead of the raised eyes 15 as shown in the drawings.

In using my novel lure, the tail wings 8 are raised upwardly the desired amount by disposing the pin 11 in the desired groove 10 to give the desired angularity between the side tail wings 8 and the center member 9. Thus any desired action is obtained in that the change in the angularity of the tail wings 8 causes the body member 1 to wobble in the water at different frequencies and the action thereof is changed. It will be evident that different speeds of boats, different types of fish, and other factors make it desirable to change the angularity of the tail 5 of the member 1 to obtain the desired rolling and pitching action.

In Figs. 7 and 8, I have shown a modified form of my invention wherein a T-shaped channel 40, having longitudinally spaced, transverse grooves 41, extends axially of the member shown in Fig. 1 for making my novel lure more rigid. The tail wings 42 and 43 are adjusted angularly by a member 44 which has oppositely disposed, depending, inwardly extending, arcuate portions 45 for extension under the upper portion of the T-shaped channel 40 to prevent a loss thereof and to reduce the likelihood of disengagement of the member 44 with one of the transverse grooves 41 to a minimum.

In Figs. 5 and 6, I have shown a modified form of my novel artificial fish lure wherein a body member 21 of comparatively flat, generally V-shaped cross-section has split portions 22 on one end thereof turned back upon itself to form transversely extending aligned apertures 23 for receiving a pin 24. The nose 25 of the member 21 is enlarged and rounded and the sides 26 of the member 1 converge in a rearward direction. A tail member 27 having diverging sides 28 has an outwardly extending, apertured projecting portion 29 adapted for alignment with the apertures 23 for receiving the pin 24. The pin 24 is drawn up so that there is considerable friction between the sides 30 of the projecting portion 29 of the tail member 27 and the inner sides 31 of the inwardly turned portion 22 of the member 21 wherein the tail 27 may be rotated only by applying considerable force. Friction washers 33 are preferably provided between the sides 30 of the projecting portion 29 and the inner sides 31 of the inwardly turned portion 22. Under operating conditions, the tail 27 will retain its angular position with relation to the longitudinally extending axis of the body member 21. An aperture 35 is provided in the nose 25 for connection to a line. Spaced, projecting portions 34 are provided in the forward part of the body member 21 to simulate the eyes of a fish. An aperture 32 is also provided in the tail 27 to connect a hook thereto as shown in Fig. 1.

It will be evident from the foregoing description that I have provided a very simple artificial fish lure which is easily adjusted along the longitudinal axis thereof wherein the tail portion may be adjusted with relation to the body portion and which may be made by stamping. My novel fish lure will normally be made from a metal stamping, although it may be a molded plastic.

Various changes may be made in the specific embodiment of my invention without departing from the spirit thereof or from the scope of the appended claims.

What I claim is:

1. An artificial fish lure comprising an elongated body member of generally V-shaped cross-section defining an enlarged, rounded head portion on one end thereof and a tail portion with outwardly diverging sides to simulate the body of a fish, a longitudinally extending central portion struck-out of the tail portion of said body member having longitudinally spaced, transverse grooves, and a pin for engaging the under side of said sides of said tail portion on opposite sides of said struck-out portion and any of the grooves on said struck-out portion for adjusting the angularity of the sides of said tail portion of said body member with relation to the longitudinal axis of said body member.

2. An artificial fish lure comprising an elongated body member having an enlarged rounded portion defining a head end and the other end of said body member having the sides thereof diverging outwardly defining a tail end, said body member having a generally V-shaped cross-section, a center portion having longitudinally spaced, transverse grooves struck-out from the tail end of said body member and extending longitudinally thereof, and a pin for engaging the sides of said tail end of said body member adjacent said struck-out center portion and any one of the grooves in said center portion for changing the angularity of the sides of said tail end with respect to the struck-out center portion thereof.

3. An artificial fish lure as set forth in claim 2 wherein said struck-out portion has an aperture for attaching a hook.

4. An artificial fish lure as set forth in claim 2 wherein the axial center of said body member and center portion in the tail end thereof is T-shape in cross-section.

5. An artificial fish lure as set forth in claim 4 wherein the pin for engaging the sides of said tail end of said body member has depending arcuate shaped portions for engaging the sides of said T-shaped center portion of the tail end.

ROBERT F. ALDERMAN.

REFERENCES CITED

The following references are of record in the file of this patent:

UNITED STATES PATENTS

| Number | Name | Date |
|---|---|---|
| 289,508 | Dawson | Dec. 4, 1883 |
| 1,540,702 | Morriss | June 2, 1925 |
| 1,602,329 | Bonnett | Oct. 5, 1926 |
| 1,861,110 | Campbell | May 31, 1932 |
| 1,913,362 | Catarau | June 13, 1933 |
| 1,993,114 | Rasmussen | Mar. 5, 1935 |
| 2,205,472 | Fagerholm | June 25, 1940 |
| 2,238,604 | Sabin | Apr. 15, 1941 |
| 2,394,132 | Zeibig | Feb. 5, 1946 |
| 2,415,633 | Hietala | Feb. 11, 1947 |